US011228558B2

United States Patent
Wang et al.

(10) Patent No.: US 11,228,558 B2
(45) Date of Patent: Jan. 18, 2022

(54) METHOD AND APPARATUS FOR ISOLATING TRANSVERSE COMMUNICATION BETWEEN TERMINAL DEVICES IN INTRANET

(71) Applicant: Hangzhou DPtech Technologies Co., Ltd., Zhejiang Province (CN)

(72) Inventors: Futao Wang, Zhejiang (CN); Qian Wang, Zhejiang (CN)

(73) Assignee: Hangzhou DPtech Technologies Co., Ltd., Zhejiang Province (CN)

( * ) Notice: Subject to any disclaimer, the term of this patent is extended or adjusted under 35 U.S.C. 154(b) by 147 days.

(21) Appl. No.: 16/726,345

(22) Filed: Dec. 24, 2019

(65) Prior Publication Data

US 2020/0213264 A1 Jul. 2, 2020

(30) Foreign Application Priority Data

Dec. 28, 2018 (CN) .......................... 201811618067.6

(51) Int. Cl.
*H04L 12/721* (2013.01)
*G06F 9/455* (2018.01)
(Continued)

(52) U.S. Cl.
CPC ........ *H04L 61/103* (2013.01); *H04L 12/4641* (2013.01); *H04L 45/74* (2013.01); *H04L 61/2015* (2013.01); *H04L 61/6022* (2013.01)

(58) Field of Classification Search
CPC .............. H04L 61/103; H04L 63/0272; H04L 12/4641; H04L 45/74; H04L 63/101;
(Continued)

(56) References Cited

U.S. PATENT DOCUMENTS

2006/0146835 A1* 7/2006 Homchaudhuri ... H04L 12/4641
370/395.53
2007/0192862 A1* 8/2007 Vermeulen ............ H04L 63/101
726/23
(Continued)

FOREIGN PATENT DOCUMENTS

CN 101383835 A 3/2009
CN 102420762 A 4/2012
(Continued)

OTHER PUBLICATIONS

State Intellectual Property Office of the People's Republic of China, Office Action and Search Report Issued in Application No. 2018116180676, dated Oct. 14, 2020, 12 pages, (Submitted with English Machine Translation).
(Continued)

*Primary Examiner* — Edan Orgad
*Assistant Examiner* — Vanneilian Lalchinthang
(74) *Attorney, Agent, or Firm* — Greenblum & Bernstein, P.L.C.

(57) ABSTRACT

Provided are a method and an apparatus for isolating transverse communication between terminal devices in an intranet. The method includes: when receiving an ARP (Address Resolution Protocol) packet, an access device in the intranet determines whether to perform a first transverse isolation operation for the ARP packet based on a pre-stored first transverse isolation policy; and when receiving a packet, a gateway device in the intranet determines whether to perform a second transverse isolation operation for the packet according to a pre-stored second transverse isolation policy.

17 Claims, 5 Drawing Sheets

(51) Int. Cl.
*H04W 4/70* (2018.01)
*H04L 29/12* (2006.01)
*H04L 12/46* (2006.01)
*H04L 12/741* (2013.01)

(58) Field of Classification Search
CPC ............ H04L 61/1511; H04L 61/2015; H04L 61/6022; H04L 12/66; H04L 29/06; H04L 47/24; H04W 12/121; H04W 4/70
USPC ........................................................ 370/329
See application file for complete search history.

(56) References Cited

U.S. PATENT DOCUMENTS

| | | | |
|---|---|---|---|
| 2011/0216770 A1* | 9/2011 | Wu ......................... | H04L 12/56 370/392 |
| 2013/0044754 A1* | 2/2013 | Zhu .................. | H04L 29/12028 370/392 |
| 2015/0106913 A1* | 4/2015 | Wang ................. | H04L 12/4625 726/13 |
| 2015/0172222 A1* | 6/2015 | Liao ...................... | H04L 49/351 370/392 |
| 2018/0027012 A1* | 1/2018 | Srinivasan ............ | H04L 63/101 726/4 |
| 2018/0351858 A1* | 12/2018 | Song .................... | H04L 12/4641 |
| 2019/0132322 A1* | 5/2019 | Song .................... | H04L 63/0236 |
| 2019/0222611 A1* | 7/2019 | Lin ....................... | G06F 9/45558 |
| 2019/0253381 A1* | 8/2019 | Ji ........................... | H04L 45/28 |
| 2020/0153846 A1* | 5/2020 | Srivastava .............. | H04W 4/70 |

FOREIGN PATENT DOCUMENTS

| | | |
|---|---|---|
| CN | 103404084 A | 11/2013 |
| CN | 104734953 A | 6/2015 |

OTHER PUBLICATIONS

State Intellectual Property Office of the People's Republic of China, Office Action and Search Report Issued in Application No. 2018116180676, dated Dec. 22, 2020, 5 pages, (Submitted with English Machine Translation).

* cited by examiner

Transverse isolation configuration

Transverse isolation port

Tip: The interface with a thick border indicates that the interface is selected as an isolation port; and the interface filled with a background color (such as gray) indicates that the interface is working. "Convex" type indicates an electrical port, "Concave" type indicates a light port.

Traffic-guiding gateway list

FIG. 5

METHOD AND APPARATUS FOR ISOLATING TRANSVERSE COMMUNICATION BETWEEN TERMINAL DEVICES IN INTRANET

CROSS REFERENCE TO RELATED APPLICATIONS

This application claims priority to Chinese Patent Application No. 201811618067.6 filed on Dec. 28, 2018, the entire content of which is incorporated herein by reference.

TECHNICAL FIELD

The present disclosure relates to the field of network security technology, and in particular to a method and an apparatus for isolating transverse communication between terminal devices in an intranet.

BACKGROUND

Because a traditional enterprise intranet is a shared network, mutual access between terminal devices in a same Virtual Local Area Network (VLAN) is not controlled in the shared network, which provides great convenience for spread of a virus or other attacks. Once an intranet security event occurs, an attack source cannot be located and controlled in the first time.

SUMMARY

To solve the deficiencies in the related art, the present disclosure provides a method and an apparatus for isolating transverse communication between terminal devices in an intranet.

According to a first aspect of an example of the present disclosure, there is provided a method of isolating transverse communication between terminal devices in an intranet. The method is specifically described below.

When receiving an ARP (Address Resolution Protocol) packet, determining, by an access device in the intranet, whether to perform a first transverse isolation operation for the ARP packet based on a pre-stored first transverse isolation policy.

When receiving a packet, determining, by a gateway device in the intranet, whether to perform a second transverse isolation operation for the packet according to a pre-stored second transverse isolation policy.

The first transverse isolation operation includes at least one of: discarding, by the access device, an ARP request packet from a terminal device, and sending, by the access device, an ARP reply packet for the ARP request packet to the terminal device; where the APR reply packet includes s an MAC (Media Access Control) address of the gateway device; or modifying, by the access device, a destination MAC address in a free ARP packet from the terminal device to the MAC address of the gateway device, and sending, by the access device, the free ARP packet to the gateway device:

The first transverse isolation policy and the second transverse isolation policy both includes information of a subnet requiring isolation of transverse communication, and the transverse communication is used to indicate communication between terminal devices in a same subnet.

According to a second aspect of an example of the present disclosure, there is provided an apparatus for isolating transverse communication between terminal devices in an intranet. The apparatus includes an access device and a gateway device.

The access device is configured to determine whether to perform a first transverse isolation operation for an ARP (Address Resolution Protocol) packet based on a pre-stored first transverse isolation policy when receiving the ARP packet.

The gateway device is configured to determine whether to perform a second transverse isolation operation for a packet based on a second pre-stored transverse isolation policy when receiving the packet.

The first transverse isolation operation includes at least one of: discarding, by the access device, an ARP request packet from a terminal device, and sending, by the access device, an ARP reply packet for the ARP request packet to the terminal device; where the APR reply packet includes an MAC (Media Access Control) address of the gateway device; or modifying, by the access device, a destination MAC address in a free ARP packet from the terminal device to the MAC address of the gateway device, and sending, by the access device, the free ARP packet to the gateway device:

The first transverse isolation policy and the second transverse isolation policy both includes information of a subnet requiring isolation of transverse communication, and the transverse communication is used to indicate communication between terminal devices in a same subnet.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The term used in the present disclosure is for the purpose of describing a particular example only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

To solve the potential security hazards of the intranet, in the network security technology field of intranet, different VLANs and relevant IP subnets are allocated to different user terminal devices according to a related solution. In this way, each user terminal is isolated from a second layer of a network architecture to prevent any malicious behavior and information detection of Ethernet.

However, this solution imposes great limitation onto future network extension. The limitation includes: 1) because the quantity of VLAN resources available to a switch is limited, if one VLAN is allocated to each terminal, the number of accessible terminal devices will be limited, and thus accessing requirements of more terminal devices cannot be satisfied; 2) the topology of each relevant Spanning Tree of each VLAN requires management. A Spanning Tree Protocol (STP) is complex and configuration of a corresponding default gateway needs to be performed for each IP subnet, resulting in complexity of the management; 3) because it is required to allocate a relevant IP subnet to each terminal, the IP subnet division will necessarily lead to wastes of some IP addresses, thereby resulting in shortage of IP addresses.

Therefore, it can be known that the related art easily leads to shortage of VLAN resources and IP subnets so that the accessing requirements of more terminal devices cannot be satisfied. Further, the topology of each relevant Spanning Tree of each VLAN needs to be managed, bringing a large burden to the network management.

Based on this, an example of the present disclosure provides a method of isolating or preventing transverse communication between terminal devices in an intranet. An access device firstly determines whether to perform a transverse isolation operation for a received ARP packet and then a gateway device determines whether to perform a transverse isolation operation for the ARP packet sent by the access device. In this way, the transverse traffic between terminal devices in an intranet is directed or guided to the gateway device to realize isolation of transverse communication between the terminal devices in the intranet. As a result, a sharing environment of the intranet is broken, a large-scope spread of a virus in the intranet is reduced and even avoided and network security of each terminal device in the intranet is helped to be improved. Compared with related art, the accessing requirements of more terminal devices are satisfied without allocating different VLANs to different terminal devices. Further, network management and configuration operation are simplified.

To make the present disclosure clearer and simpler, some technical terms mentioned in the present disclosure will be explained below.

Transverse communication refers to communication between terminal devices in a same subnet (equivalent to a same VLAN).

Transverse traffic refers to communication traffic between terminal devices in a same subnet.

MAC is Media Access Control Address in full name and also referred to as a Local Area Network (LAN) Address, an Ethernet Address or a physical address.

ARP is Address Resolution Protocol in full name.

Figure 1:
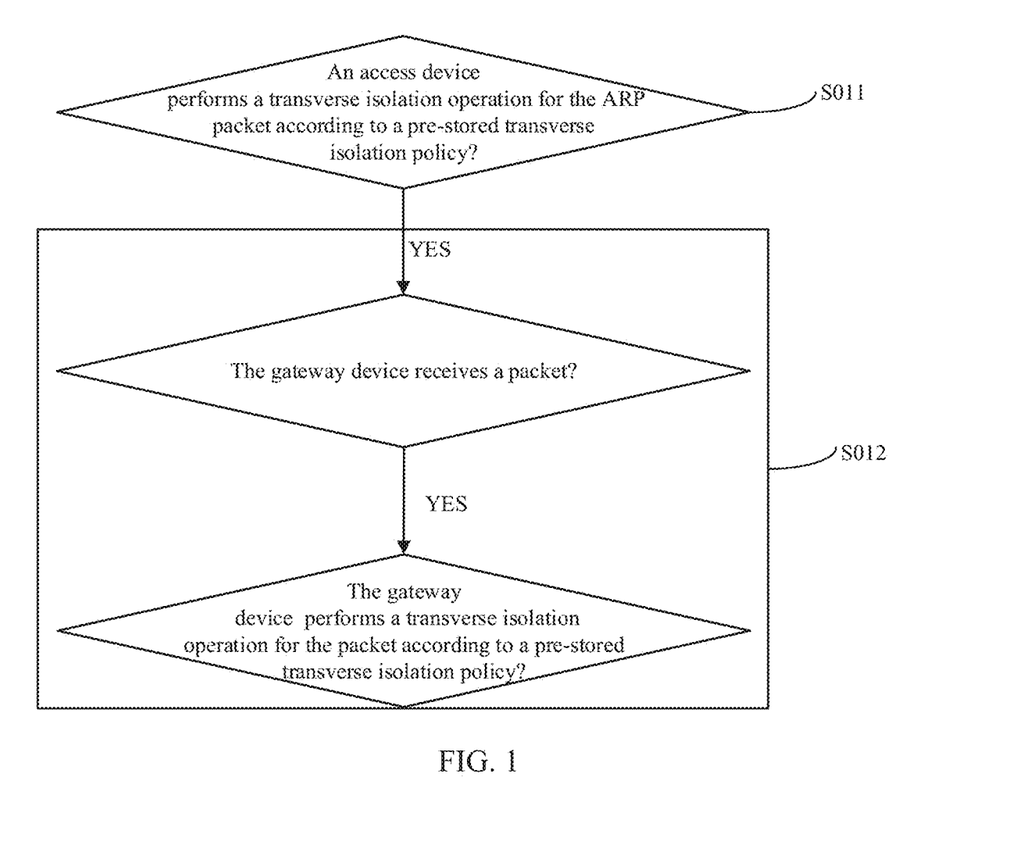
FIG. 1 is flowchart illustrating a method of isolating transverse communication between terminal devices in an intranet according to an example of the present disclosure.

FIG. 1 is a flowchart illustrating a method of isolating transverse communication between terminal devices in an intranet according to an example of the present disclosure. The method may be applied to a network system, for example, an enterprise intranet system to isolate communication between terminal devices in a same subnet. The method includes the following steps S011-S012.

At step S011, when receiving an ARP packet, an access device in the intranet determines whether to perform a transverse isolation operation for the ARP packet according to a pre-stored transverse isolation policy. The transverse isolation policy includes at least one of: discarding an ARP request packet from a terminal device, and sending an ARP reply packet for the ARP request packet to the terminal device, where the APR reply packet includes an MAC address of a gateway device; or modifying a destination MAC address in a free ARP packet from the terminal device to the MAC address of the gateway device, and sending the packet to the gateway device.

At step S012, when receiving a packet, the gateway device determines whether to perform a transverse isolation operation for the packet according to a pre-stored transverse isolation policy.

The transverse isolation policy of the access device and the transverse isolation policy of the gateway device both include information of a subnet requiring isolation of transverse communication.

The access device may include but not limited to: an access switch, an access point (AP). The gateway device may include but not limited to a core switch, a convergence switch, a router, a firewall, and a Broadband Remote Access Server (BRAS). The terminal device is a user terminal including but not limited to a table computer, a laptop computer, a host, a server and a printer.

In an example of the present disclosure, before step S011 and step S012 are performed, it is required to generate a transverse isolation policy of the access device and a transverse isolation policy of the gateway device respectively. The transverse isolation policy is used to indicate isolation of communication between terminal devices in a same subnet. In an example, the gateway device may automatically generate a transverse isolation policy based on a pre-configured transverse isolation function. Based on this, the gateway device may automatically generate the transverse isolation policy through the following step S001.

At step S001, when receiving an isolation instruction, the gateway device enables the transverse isolation function based on the isolation instruction, obtains a subnet enabling the transverse isolation function (equivalent to an isolation network segment) and generates a transverse isolation policy corresponding to the subnet to isolate communication between terminal devices in the subnet.

Different sub-policies of the transverse isolation policy have priorities. The isolation instruction may be triggered by a network administrator or automatically triggered by a system according to a preset time period or consumption of transverse traffic. In an example, the isolation instruction may carry gateway information of a subnet required to enable the transverse isolation function currently, for example, a gateway IP address.

With a subnet with network segment 10.27.0.1/16 enabling the transverse isolation function as an example, the generated transverse isolation policy of the gateway device may be as follows:

source IP segment 10.27.0.0/16 destination IP segment 10.27.0.0/16 action drop

The above transverse isolation policy means that no transverse communication is allowed between all terminal devices in the subnet with network segment 10.27.0.0/16.

However, there may be a case that a particular terminal device needs to communicate with another terminal device in the same subnet. For example, a terminal device such as a printer, a server and so on providing public services needs to be accessed by another terminal device, so that the another terminal device may obtain basic resources. In this case, to ensure the terminal devices providing public services in an intranet are normally accessed, it is necessary to allow transverse communication of the terminal devices providing public services. In an example, the gateway device may pre-store an IP address of a terminal device providing public services. With an IP address of the printer as 10.27.1.10, an allowance sub-policy for allowing transverse communication of the printer may be configured based on the above transverse isolation policy. The transverse isolation policy obtained hereby may be as follows:

Source IP segment 10.27.0.0/16 destination IP segment 10.27.1.10/32 action permit Source IP segment 10.27.0.0/16 destination IP segment 10.27.0.0/16 action drop The above transverse isolation policy means that all terminal devices in the subnet with network segment 10.27.0.0/16 are allowed to access the printer but no transverse communication is allowed between terminal devices other than the printer. In this way, normal service accesses are guaranteed while the transverse traffic isolation between the terminal devices of the intranet is realized.

In the transverse isolation policy, a priority of a basic sub-policy "Source IP segment 10.27.0.0/16 destination IP segment 10.27.0.0/16 action drop" is less than a priority of an allowance sub-policy "Source IP segment 10.27.0.0/16 destination IP segment 10.27.1.10/32 action permit".

As a result, if transverse traffics of some terminal devices such as a printer, a server and so on in the network segment are to be allowed subsequently, it is defaulted that a priority of an allowance sub-policy newly added based on the original transverse isolation policy is more than the priority of the basic sub-policy.

When a gateway device generating a transverse isolation policy receives a packet from an access device, the gateway device may determine whether to perform transverse isolation operation for the received packet based on the transverse isolation policy and information carried in the packet.

In some examples, before generating the transverse isolation policy, the gateway device may regularly send a notification packet carrying at least an IP address, a mask, an MAC address, and a VLAN-ID of the gateway device corresponding to a subnet enabling the transverse isolation function (for convenience of description, hereinafter referred to as an isolation network segment), to all access devices under a VLAN corresponding to the isolation network segment before or during performance of steps S011 and S012. It is understood that the information carried in notification packet includes at least the IP address, the mask, the MAC address and the VLAN-ID of the gateway device, so that the access device generates a corresponding transverse isolation policy based on the notification packet. A time interval for regularly sending the notification packet may be configured according to requirements and may also be a system default time, for example, 2 times/per minute. If there are a plurality of the isolation network segments (that is, a plurality of subnets enable the transverse isolation function), the gateway device sends the notification packet to all access devices under the VLANs corresponding to a plurality of isolation network segments. The notification packet may be a notification packet of broadcast type.

The process of sending, by a gateway device, a notification packet to an access device will be described below with some examples.

Figure 2:
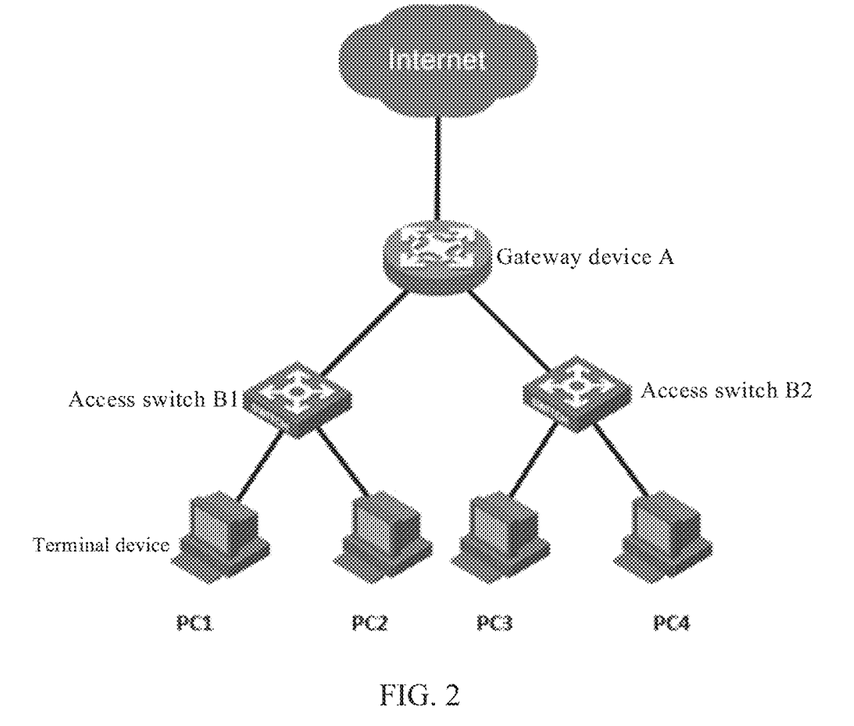
FIG. 2 is a schematic diagram illustrating a network topology structure according to an example of the present disclosure.

FIG. 2 is a schematic diagram illustrating a network topology structure according to an example of the present disclosure. As shown in FIG. 2, it is assumed that an interconnection interface of a gateway device A and an access switch B1 is gige0_1, a gateway interface is vlan-if27, a gateway IP address with mask is 10.27.0.1/16, and a gateway MAC address is 00:24:ac:fe:42:02; an interconnection interface of the gateway device A and an access switch B2 is gige0_2, a gateway interface is vlan-if28, a gateway IP address with mask is 10.28.0.1/16, and a gateway MAC address is 00:24:ac:fe:42:03. Based on this, the gateway device A sends a notification packet carrying gateway information, such as 10.27.0.1/16 00:24:ac:fe:42:02 vlan 27, to the access switch B1 through the interface gige0_1; and the gateway device A sends a notification packet carrying gateway information, such as 10.28.0.1/16 00:24:ac:fe:42:03 vlan 28, to the access switch B2 through the interface gige0_2.

Correspondingly, the access switch may automatically generate a corresponding transverse isolation policy based on the notification packet sent by the gateway device, which specifically includes the following steps S003.

At step S003, after receiving the notification packet, the access device establishes and stores a first gateway information entry corresponding to the isolation network segment, where information recorded in the first gateway information entry includes information carried in the notification packet.

The first gateway information entry may be used as the transverse isolation policy of the access device. As a result, based on the information recorded in the first gateway information entry, the access device may direct or guide the transverse traffic between terminal devices in the isolation network segment corresponding to the first gateway information entry to the gateway device, thereby isolating the transverse traffic between terminal devices in an intranet.

The first gateway information entry will be described below based on an example in which the gateway device sends a notification packet to the access device.

After receiving the notification packet from the gateway device A, the access switches B1 and B2 obtain an IP address, a mask, an MAC address and a VLAN-ID of the gateway device from corresponding notification packets respectively, and establish the following corresponding first gateway information entries based on the above information.

TABLE 1 the first gateway information entry of the access switch B1

| IP address | Mask | MAC address | VLAN-ID |
|---|---|---|---|
| 10.27.0.1 | 16 | 00:24:ac:fe:42:02 | 27 |

TABLE 2

| the first gateway information entry of the access switch B2 | | | |
|---|---|---|---|
| IP address | Mask | MAC address | VLAN-ID |
| 10.28.0.1 | 16 | 00:24:ac:fe:42:03 | 28 |

Therefore, when receiving an ARP packet, the access device establishing and storing the first gateway information entry may determine whether to perform a transverse isolation operation for the received ARP packet according to the information carried in the ARP packet and/or the information recorded in the first gateway information entry.

The access device may realize isolation of the ARP packet according to the first gateway information entry. However, since a terminal device does not need to first obtain an MAC address by sending an ARP request packet before sending a broadcast packet, the broadcast packet cannot be blocked based on the above first gateway information entry. Thus, the broadcast packet may affect intranet security. To solve the technical problem, in an example, the method further includes the following steps S004-S005.

At step S004, the access device marks an ingress interface receiving the notification packet as an uplink interface and marks another interface other than the ingress interface as a downlink interface.

At step S005, the access device establishes an isolation group for the downlink interfaces to block the broadcast packets.

For example, the access device has interfaces Gige0_0~Gige0_23. If the Gige0_6 is identified as an uplink interface, the interfaces Gige0_0~Gige0_5 and Gige0_7~Gige0_23 will be marked as downlink interfaces. At this time, the access device establishes an isolation group for the interfaces Gige0_0~Gige0_5 and Gige0_7~Gige0_23 to prohibit mutual communication between these interfaces, thereby realizing transverse isolation of these interfaces.

Further, if the ingress interface is an aggregation interface, each interface of the aggregation interface is marked as an uplink interface.

Subsequently, if a downlink interface of the access device receives a notification packet from the gateway device, the access device marks the downlink interface as an uplink interface. At this time, the downlink interface marked as the uplink interface automatically exits from the isolation group. For example, when the interface Gige0_7 receives the notification packet from the gateway device, the access device will re-mark the interface Gige0_7 which is previously marked as the downlink interface as an uplink interface. After being marked, the interface Gige0_7 will automatically exit from the isolation group. Thus, the interfaces of the isolation group will be changed into Gige0_0~Gige0_5 and Gige0_8~Gige0_23.

Since the terminal device usually sends a broadcast packet to the access device through a downlink interface, the access device may establish an isolation group for all downlink interfaces, so that it can prohibit communication between a terminal device sending the broadcast packet and terminal devices corresponding to other downlink interfaces in the same isolation group.

The examples of the present disclosure do not limit the performing sequence of steps S003 and S004.

Based on the step S004, the information recorded in the first gateway information entry may be optimized. For example, ingress interface information is added in the first gateway information entry. With the interface Gige0_6 identified as an uplink interface, the first gateway information entry of the access switch B1 is optimized and the optimized first gateway information entry is as shown in Table 3.

TABLE 3

| the first gateway information entry of the access switch B1 | | | | |
|---|---|---|---|---|
| IP address | Mask | MAC address | VLAN-ID | Ingress interface |
| 10.27.0.1 | 16 | 00:24:ac:fe:42:02 | 27 | Gige0_6 |

Therefore, based on the optimized first gateway information entry, the access device may realize not only isolation of transverse traffic between terminal devices in an intranet but also isolation of the broadcast packet.

In an example, based on the optimized first gateway information entry, the step S011 may be optimized. For example, the access device determines whether to perform transverse isolation operation for an ARP packet only when a downlink interface of the access device receives the ARP packet. It is understood that the access device defaults to perform transverse isolation operation for an ARP packet received by its downlink interface and not to perform transverse isolation operation for an ARP packet received by its uplink interface.

After establishing the first gateway information entry, the access device may perform isolation for transverse traffic between terminal devices in an intranet. However, there may be a case that an attacker sends a spoofing notification packet to mislead the access device. In this case, a potential security hazard may exist in the intranet. To solve the technical problem, the access device and the gateway device may perform verification for correctness of the information recorded in the first gateway information entry. Based on this, in an example, the method further includes the following steps S0061-S0065.

At step S0061, the access device sends a verification packet to the gateway device to perform verification for the first gateway information entry, where the verification packet carries at least one piece of information in the first gateway information entry.

At step S0062, when receiving the verification packet, the gateway device determines whether the information carried in verification packet is correct.

At step S0063, if any piece of information carried in the verification packet is wrong, the gateway device sends a confirmation packet carrying a wrong identifier and a correct IP address, correct mask, correct MAC address and correct VLAN-ID of the gateway device to the access device, and further the gateway device sends a free ARP packet carrying the correct IP address and the correct MAC address of the gateway device.

At step S0064, if all information carried in the verification packet is correct, the gateway device sends a confirmation packet carrying a correct identifier to the access device.

At step S0065, when receiving the confirmation packet, if the access device detects a wrong identifier, the access device updates the corresponding information recorded in the first gateway information entry according to the correct IP address, correct mask, correct MAC address and correct VLAN-ID of the gateway device carried in the confirmation packet. If the access device detects the identifier carried in the confirmation packet is a correct identifier, the access device may not update the corresponding information recorded in the first gateway information entry.

If two or more first gateway information entries are stored in the access device, it is required to perform verification for information in each first gateway information entry. Correspondingly, at step S0061, the access device may send a verification packet corresponding to each first gateway information entry to the gateway device.

The information carried in verification packet includes an IP address, a mask, an MAC address and a VLAN-ID of the gateway device recorded in the first gateway information entry currently verified. Based on this, at step S0062, after receiving the verification packet, the gateway device confirms whether the IP address, the mask, the MAC address and a VLAN-ID of the gateway device in the verification packet are correct.

Further, at step S0063, the gateway device may also generate an abnormality alert log and send an abnormality alert.

In another example, the free ARP packet at step S0063 may be sent by the access device rather than the gateway device. Based on this, the free ARP packet may be sent by the access device when a wrong identifier is detected based on the verification packet.

After transverse isolation policies of the gateway device and the access device are generated or verification of the information recorded in each first gateway information entry is completed, transverse communication between terminal devices in the intranet is isolated.

Figure 3:
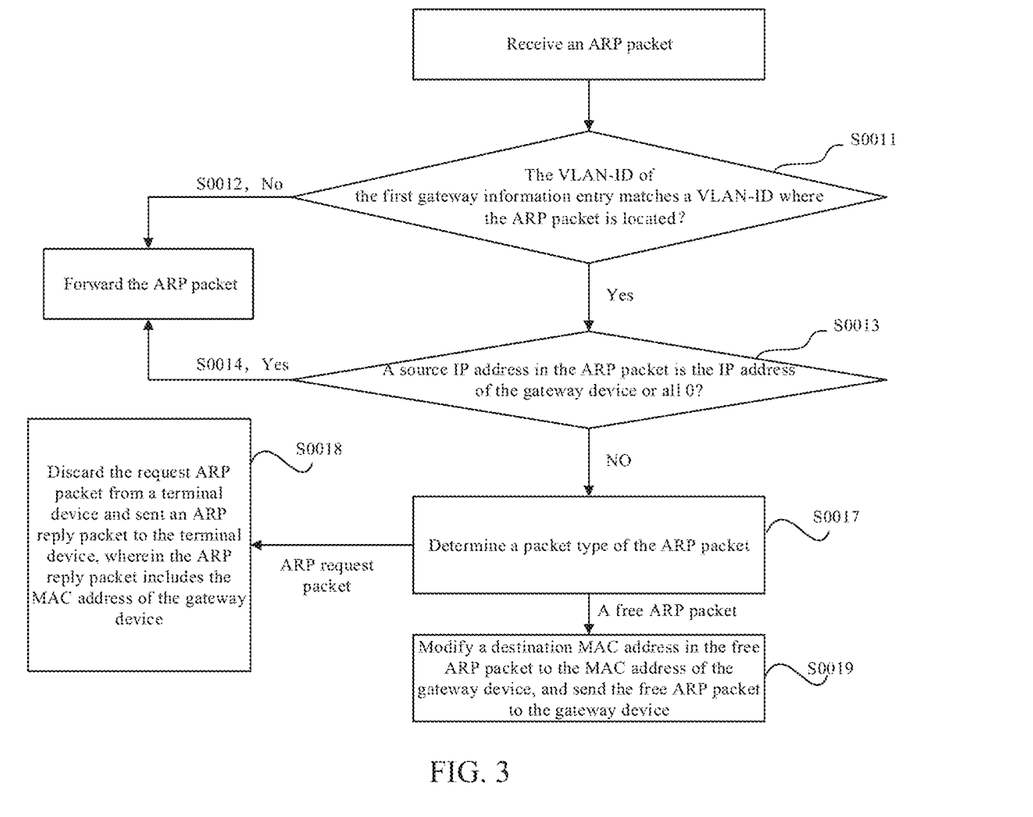
FIG. 3 is a schematic diagram illustrating a process of performing, by an access device, transverse isolation for a received ARP packet according to an example of the present disclosure.

FIG. 3 is a schematic diagram illustrating a process of performing, by an access device, transverse isolation for a received ARP packet according to an example of the present disclosure. As shown in FIG. 3, when the access device receives the ARP packet, determining whether to perform transverse isolation operation for the ARP packet according to the information in the first gateway information entry includes the following steps S0011-S0019.

At step S0011, it is determined whether the VLAN-ID of the first gateway information entry matches a VLAN-ID where the ARP packet is located. When the VLAN-ID of the first gateway information entry is consistent with the VLAN-ID where the ARP packet is located, it is determined that the VLAN-ID of the first gateway information entry matches the VLAN-ID where the ARP packet is located.

At step S0012, if the VLAN-ID of the first gateway information entry does not match the VLAN-ID where the ARP packet is located, it indicates that a network segment where the ARP packet is located is a non-isolation network segment and thus the ARP packet may be normally forwarded; if the VLAN-ID of the first gateway information entry matches the VLAN-ID where the ARP packet is located, it indicates a network segment where the ARP packet is located is an isolation network segment and a skip is made to step S0013.

At step S0013, it is determined whether a source IP address in the ARP packet is the IP address of the gateway device or all 0.

At step S0014, if the source IP address in the ARP packet is the IP address of the gateway device or all 0, the packet is normally forwarded; if the source IP address in the ARP packet is neither the IP address of the gateway device nor all 0, a skip is made to step S0017.

At step S0017, a packet type of the ARP packet is determined.

At step S0018, if the ARP packet is an ARP request packet, the ARP request packet from a terminal device is discarded and an ARP reply packet is sent to the terminal device, where the ARP reply packet includes the MAC address of the gateway device.

At step S0019, if the ARP packet is a free ARP packet, a destination MAC address in the free ARP packet is modified to the MAC address of the gateway device, and the free ARP packet is sent to the gateway device.

In this way, the access device may process the ARP packet within a network segment being the isolation network segment at steps S0011-S0019. The ARP packet with the source IP address being neither the IP address of the gateway device nor all 0 is discarded, and the gateway MAC address is replied to the corresponding terminal device. The destination MAC address in the free ARP packet with the source IP address being neither the IP address of the gateway device nor all 0 is modified to the gateway MAC address, and the free ARP is sent to the gateway device. Therefore, the transverse traffic between terminal devices in the isolation network segment is directed or guided to the gateway device to realize isolation of communication between terminal devices in the intranet.

It is noted that the access device defaults to redirect all ARP packets to a CPU for processing, and forwarding processing units other than the CPU of the access device will not forward the ARP packet. The above steps S0011-S0019 are all performed in the CPU of the access device.

In an example, to eliminate a stray packet with source IP address and destination IP address not belonging to the same network segment to avoid the impact of the stray packet on the transverse isolation effect, the access device may determine whether to perform transverse isolation operation for the ARP packet according to the information in the first gateway information entry before the packet type of the ARP packet is determined. Determining whether to perform transverse isolation operation for the ARP packet according to the information in the first gateway information entry includes the following step S0015: at step S0015, it is determined whether the source IP address and the destination IP address in the ARP packet is in the same network segment; if not, the ARP packet is discarded; and if yes, the packet type of the ARP packet is determined. Based on this, the step S0014 is adaptively modified as follows: if the source IP address in the ARP packet is the IP address of the gateway device or all 0, the packet is normally forwarded; if the source IP address in the ARP packet is neither the IP address of the gateway device nor all 0, a skip is made to the step S0015.

Figure 4:
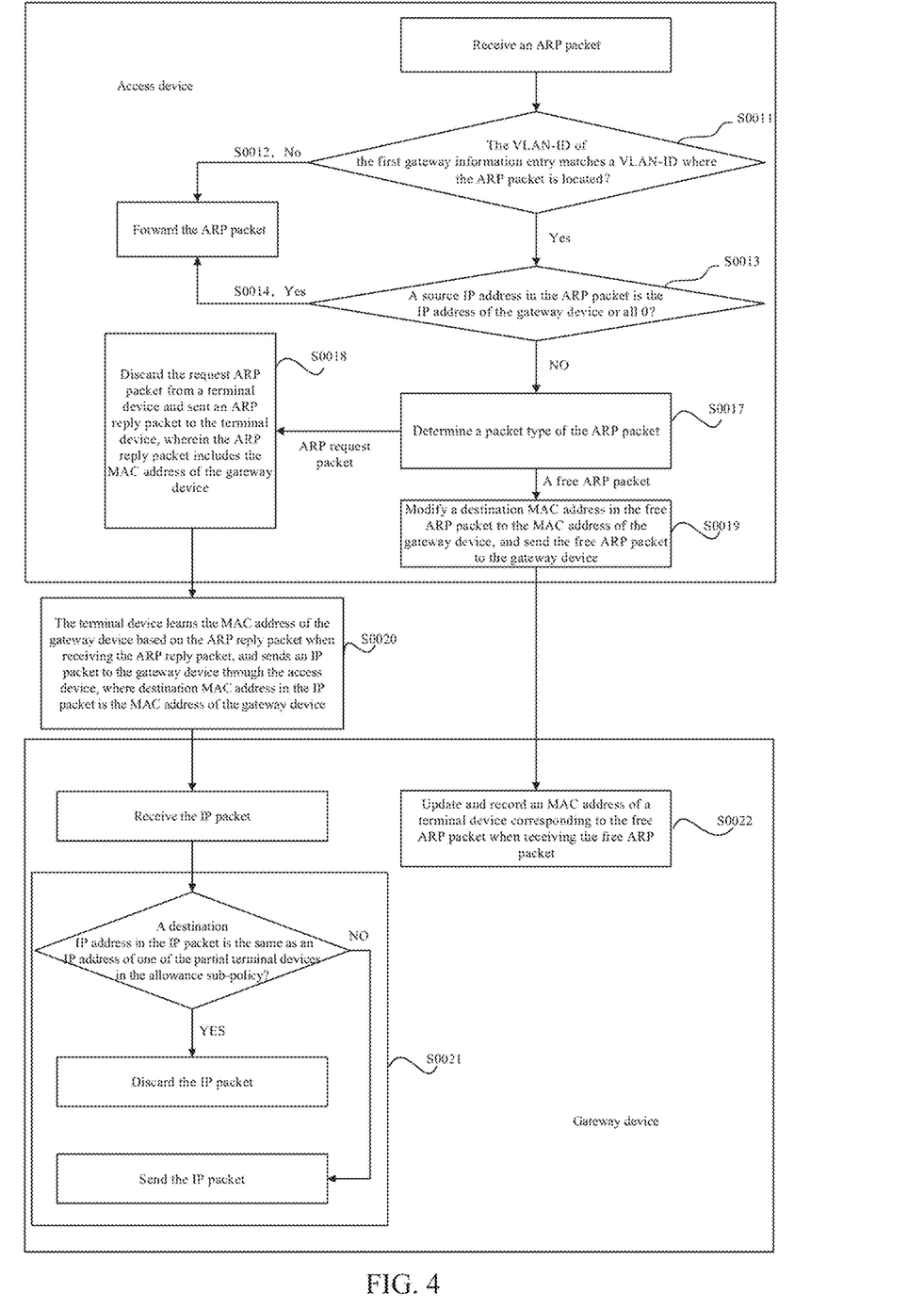
FIG. 4 is a flowchart illustrating a method of isolating transverse communication between terminal devices in an intranet according to an example of the present disclosure.

FIG. 4 is a flowchart illustrating a method of isolating transverse communication between terminal devices in an intranet according to an example of the present disclosure. As shown in FIG. 4, after the access device sends an ARP reply packet to the terminal device, the method further includes the following step S0020: at step S0020, when receiving the ARP reply packet, the terminal device learns the MAC address of the gateway device based on the ARP reply packet, and sends an IP packet to the gateway device through the access device. A destination MAC address in the IP packet is the MAC address of the gateway device. Thus, after receiving the IP packet, the gateway device may determine whether to perform transverse isolation operation for the IP packet based on its transverse isolation policy.

In some examples, a transverse isolation operation of the gateway device includes: a basic sub-policy, configured to isolate communication between all terminal devices in the subnet; and an allowance sub-policy, configured to allow communication between partial terminal devices in the subnet. A priority of the allowance sub-policy is more than that of the basic sub-policy.

Based on this, determining whether to perform transverse isolation operation for the IP packet based on the transverse isolation policy of the gateway device includes the following step S0021: at step S0021, when receiving the IP packet, the gateway device determines whether a destination IP address in the IP packet is the same as an IP address of one of the partial terminal devices in the allowance sub-policy; if the destination IP address in the IP packet is different from an IP address of any of the partial terminal devices, the gateway device discards the IP packet, when the destination IP address in the IP packet the same as the IP address of the one of the partial terminal devices, the gateway device sends the IP packet to the one of the partial terminal devices corresponding to the destination IP address. For example, it is assumed that the transverse isolation policy of the gateway device allows all terminal devices in the intranet to access a printer. In this case, if the destination IP address in the IP packet is an IP address of the printer, the IP packet is allowed to be sent to the printer. At this time, the gateway device sends the IP packet to the printer. On the contrary, if the destination IP address in the IP packet is an IP address of a terminal prohibited from performing transverse communication, the IP packet is not allowed to be sent to the terminal device corresponding to the IP address. At this time, the gateway device does not send the IP packet but discards the IP packet.

After the access devices sends a free ARP packet from a terminal device to the gateway device, the gateway device may determine whether to perform transverse isolation operation for the free ARP packet according to its transverse isolation policy, which specifically includes the following step S0022: at step S0022, when receiving the free ARP packet, the gateway device updates and records an MAC address of a terminal device corresponding to the free ARP packet. The terminal device refers to a terminal device indicated by the source IP address in the free ARP packet. As a result, only the gateway device updates the MAC address of the terminal device indicated by the source IP address in the free ARP packet according to the free ARP packet, and other terminal devices in the network segment where the terminal device is located will not update the MAC address of the terminal device. In this way, the impact of the free ARP packet on the intranet security is reduced effectively.

As can be known from the above, an ARP packet is firstly subjected to a first transverse isolation performed by the access device and then subjected to a second transverse isolation performed by the gateway device if the ARP packet is allowed to arrive at the gateway device. Therefore, isolation is performed for transverse communication between terminal devices in the intranet by the access device and the gateway device. In this way, a sharing environment of an intranet is broken effectively, a large-scope spread of a virus in the intranet is reduced and even avoided, and network security of each terminal device in the intranet is helped to be improved. Compared with related art, the accessing requirements of more terminal devices are satisfied without allocating different VLANs to different terminal devices. Further, network management and configuration operation are simplified.

In another example, in addition to the above examples of automatically generating the transverse isolation policy, the transverse isolation policy may also be configured by a network administrator, which can be understood as: configuring the transverse isolation policy respectively for the access device and the gateway device in a static configuration manner. Based on this, the transverse isolation policies of the access device and the gateway device may be configured in the following process.

Firstly, a transverse isolation policy is configured for a subnet requiring isolation (hereinafter referred to as an isolation network segment) in the gateway device to isolate transverse mutual access traffic between terminal devices in the isolation network segment. For example, by taking the isolation network segment 10.27.0.1/16 as an example, the following Access Control List (ACL) policy (i.e. the transverse isolation policy) may be configured to isolate communication between terminal devices in the network segment 10.27.0.0/16.

Source IP segment 10.27.0.0/16 destination IP segment 10.27.0.0/16 action drop

Therefore, all terminal devices in the network segment 10.27.0.0/16 are prohibited from communication based on the above ACL policy.

However, there may be a case that a particular terminal needs to communicate with another terminal in the same network segment. For example, a terminal device such as a printer, a server and so on providing public services needs to be accessed by another terminal, so that the another terminal device may obtain basic resources. In this case, to ensure the devices providing public services in an intranet are normally accessed, it is necessary to allow transverse communication of the terminal device providing public services. For example, if there is a server with an IP address 10.27.0.6 and a printer with an IP address 10.27.0.7 in the network segment 10.27.0.0/16, the network administrator may configure a transverse isolation policy for allowing transverse communication traffic of the server and the printer based on the above ACL policy as shown below:

Source IP segment 10.27.0.0/16 destination IP segment 10.27.0.6/32 action permit Source IP segment 10.27.0.0/16 destination IP segment 10.27.0.7/32 action permit Source IP segment 10.27.0.0/16 destination IP segment 10.27.0.0/16 action drop All terminal devices in the subnet with network segment 10.27.0.0/16 are allowed to access the server and the printer but no transverse communication is allowed between terminal devices other than the server and the printer. In this was, normal service accesses are guaranteed while the transverse traffic isolation between the terminal devices in the intranet is realized.

A priority of a basic sub-policy "Source IP segment 10.27.0.0/16 destination IP segment 10.27.0.0/16 action drop" in the above transverse isolation policy is less than priorities of the allowance sub-policies "Source IP segment 10.27.0.0/16 destination IP segment 10.27.0.6/32 action permit" and "Source IP segment 10.27.0.0/16 destination IP segment 10.27.0.7/32 action permit".

Therefore, if transverse traffics of some terminal devices such as a printer, a server and so on in the network segment are to be allowed subsequently, it is defaulted that a priority of an allowance sub-policy newly added based on the original transverse isolation policy is more than the priority of the basic sub-policy.

Figure 5:
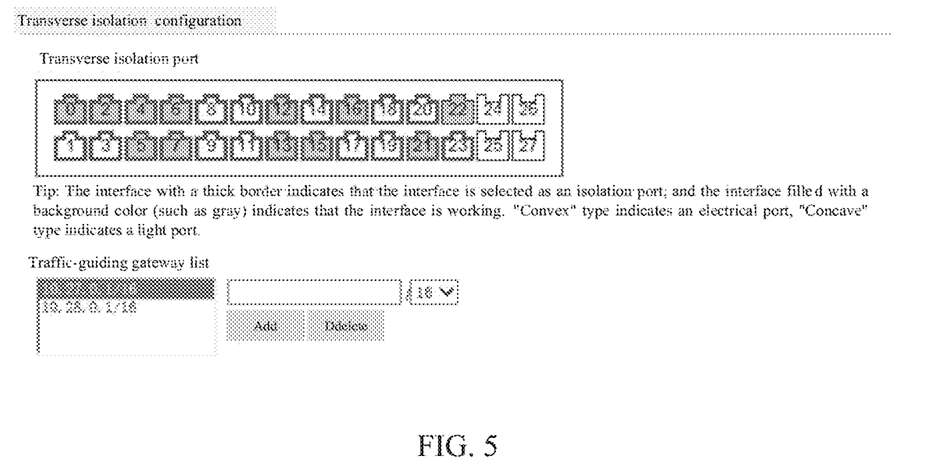
FIG. 5 is a schematic diagram illustrating a user graphic interface for configuring a transverse isolation policy of an access device according to an example of the present disclosure.

Secondly, configuring the transverse isolation policy on the access device includes a configuration of an isolation port and a configuration of an IP address and a mask of the gateway device corresponding to the isolation network segment. FIG. 5 is a schematic diagram illustrating a user graphic interface for configuring a transverse isolation policy of an access device according to an example of the present disclosure. As shown in FIG. 5, a user graphic interface for configuring the transverse isolation policy of the access device may be provided for the network administrator. The user graphic interface displays a transverse isolation port configuration region for configuring the isolation port and a traffic-directing or traffic-guiding gateway list region for configuring an IP address and a mask of the gateway device corresponding to the isolation network segment. The transverse isolation port configuration region displays all ports of the access device and the traffic-directing gateway list region displays IP addresses and masks of gateway device corresponding to a plurality of network segments. Thus, after the network administrator selects a port requiring transverse isolation in the transverse isolation port configuration region and selects a network segment requiring transverse isolation in the traffic-directing gateway list region, the access device may read the IP address and the mask of gateway device corresponding to the isolation network segment and the information of the isolation ports, and establish an isolation group for the selected isolation ports to isolate transverse traffic. The numbers of the isolation ports and the isolation network segments selected by the network administrator are not limited.

In an example, the access device sends the ARP packet to the gateway device through the IP address of the gateway device corresponding to the isolation network segment and automatically learns the MAC address of the gateway device corresponding to the isolation network segment. Afterwards, the access device may establish a second gateway information entry based on the IP address and the mask of the gateway device corresponding to the isolation network segment configured by the network administrator and the learned MAC address of the gateway device. The second gateway information entry includes the IP address and the mask and the gateway MAC address of the gateway device except for the VLAN-ID corresponding to the isolation network segment. The second gateway information entry may be used as the transverse isolation policy of the access device.

In another example, since the isolation port of the access device is pre-configured, the access device may determine its uplink interface and downlink interface according to the pre-configured isolation ports. In this case, the access device may default to perform transverse isolation for an ARP packet received by its downlink interface and not to perform transverse isolation for an ARP packet received by its uplink interface.

In an example, to ensure correctness of information in each second gateway information entry, verification may be performed for each second gateway information entry in the following steps S0061'-S0065'.

At step S0061', the access device traverses all second gateway information entries stored in the access device, and regularly sends a first ARP request packet with a source IP address being 0 to a gateway device.

At step S0062', when receiving the first ARP request packet, the gateway device sends a first ARP reply packet to the access device.

At step S0063', when receiving the first ARP reply packet, the access device learns a corresponding a first MAC address of the gateway device based on the first ARP reply packet, and determines whether a gateway MAC address in the second gateway information entry corresponding to the first ARP reply packet is consistent with the first MAC address of the gateway device.

At step S0064', if not, it indicates that the gateway MAC address of the gateway in the corresponding second gateway information entry is wrong. At this time, the access device modifies the MAC address of the gateway in the second gateway information entry to the first MAC address of the gateway device and sends a free ARP packet carrying a correct MAC address of the gateway device to correct the wrong information.

At step S0065', if yes, it indicates that the MAC address in the corresponding second gateway information entry is correct and the access device does not perform an operation for correcting wrong information.

At step S0064', the access device may further generate an abnormality alert log.

After the transverse isolation policies of the gateway device and the access device are configured, the gateway device and the access device may be directly used to realize isolation of transverse communication between terminal devices in an intranet. When the access device receives an ARP packet, the access device may determine whether to perform transverse isolation operation for the ARP packet based on the information of the second gateway information entry, which specifically includes the following steps S0011'-S0017'.

At step S0011', it is determined whether a source IP address in the ARP packet is all 0.

At step S0012', if the source IP address is all 0, the ARP packet is normally forwarded; otherwise, it is determined whether the source IP address in the ARP packet belongs to the isolation network segment.

At step S0013', if the source IP address in the ARP packet does not belong to the isolation network segment, the ARP packet is normally forwarded. Otherwise, it is determined whether the source IP address and a destination IP address in the ARP packet are in a same network segment.

At step S0014', if the source IP address and the destination IP address in the ARP packet are not in the same network segment, the ARP packet is discarded. Otherwise, it is determined whether the source IP address is the gateway IP address.

At step S0015', if the source IP address is the gateway IP address, the ARP packet is normally forwarded. Otherwise, a packet type of the ARP packet is determined.

At step S0016', if the ARP packet is an ARP request packet, the current ARP packet from a terminal device is discarded, and an ARP reply packet is sent to the terminal device, where the APR reply packet includes the MAC address of the gateway device.

At step S0017', if the ARP packet is a free ARP packet, the destination MAC address in the free ARP packet is modified to the MAC address of the gateway device, and the free ARP packet is sent to the gateway device.

The access device may obtain the second gateway information entry which is in the same network segment as the source IP address in the ARP packet based on a longest matching algorithm so that the obtained second gateway information entry is directly applied to process the ARP packet at steps S0013'-S0017'.

It is noted that the access device may default to redirect all ARP packets to the CPU for processing and forwarding processing units other than the CPU of the access device will not forward the APR packet. The above steps S0011'-S0017' are all performed in the CPU of the access device.

After the access device sends an ARP reply packet to the terminal device, the method further includes: when receiving the ARP reply packet, the request terminal device learns the MAC address of the gateway device based on the ARP reply packet and sends an IP packet to the gateway device through the access device. A destination MAC address in the IP packet is the MAC address of the gateway device Thus, after receiving the IP packet, the gateway device may determine whether to perform transverse isolation operation for the IP packet based on its transverse isolation policy. Refer to the foregoing descriptions for the step S0021, and details are not described herein again.

In an example, after the access devices sends a free ARP packet to the gateway device, the gateway device may determine whether to perform transverse isolation operation for the free ARP packet according to its transverse isolation policy. Refer to the foregoing descriptions for the step S0022, and details are not described herein again.

As can be known from the above, an ARP packet is firstly subjected to a first transverse isolation performed by the access device and then subjected to a second transverse isolation performed by the gateway device if allowed to arrive at the gateway device. Therefore, isolation is performed for transverse communication between terminal devices in the intranet by the access device and the gateway device. In this way, a sharing environment of an intranet is broken effectively, a large-scope spread of a virus in the intranet is reduced and even avoided, and network security of each terminal device in the intranet is helped to be improved. Compared with related art, the accessing requirements of more terminal devices are satisfied without allocating different VLANs to different terminal devices. Further, network management and configuration operation are simplified.

In an example, the present disclosure may also default to perform transverse isolation for all network segments (or may be referred to as transverse isolation for all intranets) in addition to performing isolation for transverse traffic between some terminal devices in the intranet.

In an example, the present disclosure may also perform isolation for transverse traffic between terminal devices of different network segments, for example, the gateway device may configure a transverse isolation policy between different network segments as follows:

Source IP segment 10.27.0.0/16 destination IP segment 10.28.0.0/16 action drop

The above transverse isolation policy means that no transverse communication is allowed between all terminal devices in the subnet with network segment 10.27.0.0/16.

Corresponding to any one example of the above method of isolating transverse communication between terminal devices in an intranet, an example of the present disclosure further provides an apparatus for isolating transverse communication between terminal devices in an intranet. The apparatus includes an access device and a gateway device.

The access device is used to determine whether to perform transverse isolation operation for an ARP packet according to a pre-stored traverse isolation policy when receiving the ARP packet. The transverse isolation policy includes at least one of: discarding an ARP packet from a terminal device, and sending an ARP reply packet for the ARP request packet to the terminal device, where the APR reply packet includes an MAC address of the gateway device; or modifying a destination MAC address in a free ARP packet from the terminal device to an MAC address of the gateway device and sending the free ARP packet to the gateway device.

The gateway device is used to determine whether to perform a transverse isolation operation for a packet according to a pre-stored transverse isolation policy when receiving the packet.

The transverse isolation policies of the access device and the gateway device both include information of a subnet requiring isolation of transverse communication, where the transverse communication is used to indicate communication between terminal devices in a same subnet.

The specific implementation process of the functions and effects of the access device and the gateway device in the apparatus may be referred to the implementation process of corresponding steps in the above method and will not be repeated herein.

Corresponding to any one example of the above method of isolating transverse communication between terminal devices in an intranet, an example of the present disclosure further provides a non-transitory computer-readable storage medium storing computer programs. The computer programs are executed by a processor to realize the steps of the method of isolating transverse communication between terminal devices in an intranet according to any one of the above examples.

In the examples of the present disclosure, the form of computer program products implemented on one or more storage mediums containing program codes including but not limited to magnetic disk memory, a CD-ROM, and optical memory and so on may be adopted. The computer available storage medium includes permanent, non-permanent, mobile and non-mobile media, which can realize information storage by any method or technology. The information may be computer readable instructions, data structures, program modules and other data. The examples of the computer storage medium include but not limited to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology. CD-ROM, a digital versatile disc (DVD) or other optical storage, a cassette type magnetic tape, magnetic disk storage or other magnetic storage device or other non-transmission medium for storing information accessed by computing devices.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. A method of isolating transverse communication between terminal devices in an intranet, comprising:
    when receiving an ARP (Address Resolution Protocol) packet, determining, by an access device in the intranet, whether to perform a first transverse isolation operation for the ARP packet based on a pre-stored first transverse isolation policy; and
    when receiving a packet, determining, by a gateway device in the intranet, whether to perform a second transverse isolation operation for the packet according to a pre-stored second transverse isolation policy;
    wherein the first transverse isolation operation comprises at least one of:
        discarding, by the access device, an ARP request packet from a terminal device, and sending, by the access device, an ARP reply packet for the ARP request packet to the terminal device; wherein the APR reply packet comprises an MAC (Media Access Control) address of the gateway device; or
        modifying, by the access device, a destination MAC address in a free ARP packet from the terminal device to the MAC address of the gateway device, and sending, by the access device, the free ARP packet to the gateway device;

wherein the first transverse isolation policy and the second transverse isolation policy both comprise information of a subnet requiring isolation of transverse communication, and the transverse communication is used to indicate communication between terminal devices in a same subnet;

wherein a priority of an allowance sub-policy newly added in the second transverse isolation policy is higher than that of a basic sub-policy in the second transverse isolation policy; and wherein the allowance sub-policy is configured to allow communication between partial terminal devices in the subnet, and the basic sub-policy is configured to isolate communication between all terminal devices in the subnet.

2. The method according to claim 1, wherein the second transverse isolation policy is automatically generated by the gateway device in a generation process comprising:

when receiving an isolation instruction, by the gateway device, enabling a transverse isolation function based on the isolation instruction;

obtaining, by the gateway device, the subnet enabling the transverse isolation function; and generating, by the gateway device, the second transverse isolation policy of the subnet to isolate communication between terminal devices in the subnet.

3. The method according to claim 2, wherein before generating the second transverse policy, the method further comprising:

sending, by the gateway device, a notification packet to the access device, wherein information carried in the notification packet comprises an IP address, a mask, the MAC address and a VLAN-ID (Virtual Local Area Network-Identifier) of the gateway device corresponding to the subnet.

4. The method according to claim 3, wherein the first transverse isolation policy is automatically generated by the access device based on the notification packet in a generation process comprising:

when receiving the notification packet from the gateway device, establishing and storing, by the access device, a first gateway information entry based on the notification packet, wherein information recorded in the first gateway information entry comprises the information carried in the notification packet; and using, by the access device, the first gateway information entry as the first transverse isolation policy.

5. The method according to claim 4, wherein determining, by the access device, whether to perform the first transverse isolation operation for the ARP packet, comprising:

determining, by the access device, whether the VLAN-ID of the first gateway information entry matches the VLAN-ID where the ARP packet is located;

when the VLAN-ID of the first gateway information entry matches the VLAN-ID where the ARP packet is located, determining, by the access device, whether a source IP address in the ARP packet is the IP address of the gateway device or all 0;

when the source IP address in the ARP packet is neither the IP address of the gateway device nor all 0, determining, by the access device, a packet type of the ARP packet;

when the ARP packet is an ARP request packet, discarding, by the access device, the request ARP packet from a terminal device, and sending, by the access device, an ARP reply packet to the terminal device, wherein the ARP reply packet comprises the MAC address of the gateway device;

when the ARP packet is a free ARP packet, modifying, by the access device, a destination MAC address in the free ARP packet to the MAC address of the gateway device, and sending, by the access device, the free ARP packet to the gateway device.

6. The method according to claim 5, further comprising:

determining, by the access device, whether a source IP address and a destination IP address in the ARP packet are in a same subnet; and when the source IP address and the destination IP address in the ARP packet are in the same subnet, determining the packet type of the ARP packet.

7. The method according to claim 5, further comprising:

when receiving the ARP reply packet, learning, by the terminal device, the MAC address of the gateway device based on the ARP reply packet, and sending, by the terminal device, an IP (Internet Protocol) packet to the gateway device through the access device, wherein a destination MAC address in the IP packet is the MAC address of the gateway device.

8. The method according to claim 7, wherein determining, by the gateway device, whether to perform the second transverse isolation operation for the packet, comprising:

when receiving the IP packet, determining, by the gateway device, whether a destination IP address in the IP packet is the same as an IP address of one of the partial terminal devices in the allowance sub-policy;

when the destination IP address in the IP packet is different from an IP address of any of the partial terminal devices, discarding, by the gateway device, the IP packet;

when the destination IP address in the IP packet the same as the IP address of the one of the partial terminal devices, sending, by the gateway device, the IP packet to the one of the partial terminal devices corresponding to the destination IP address.

9. The method according to claim 5, wherein after the access device sends the free ARP packet to the gateway device, determining, by the gateway device, whether to perform the second transverse isolation operation for the free ARP packet, comprising:

when receiving the free ARP packet, updating and recording, by the gateway device, an MAC address of a terminal device corresponding to the free ARP packet.

10. The method according to claim 4, further comprising:

sending, by the access device, a verification packet to the gateway device to perform verification for the first gateway information entry, wherein the verification packet carries at least one piece of information of the first gateway information entry;

when receiving the verification packet, determining, by the gateway device, whether information carried in the verification packet is correct;

when the information carried in the verification packet is wrong, sending, by the gateway device, a confirmation packet carrying a wrong identifier and a correct IP address, correct mask, correct MAC address and correct VLAN-ID of the gateway device to the access device.

11. The method according to claim 3, further comprising:

marking, by the access device, an ingress interface receiving the notification packet as an uplink interface, and marking, by the access device, other interfaces other than the ingress interface as downlink interfaces; and establishing, by the access device, an isolation group for the downlink interfaces to block a broadcast packet.

12. The method according to claim 1, wherein the first transverse isolation policy is generated by the access device based on a second gateway information entry in a generation process comprising:
obtaining, by the access device, an IP address and a mask of a corresponding gateway device based on a pre-input subnet requiring isolation of transverse communication;
obtaining, by the access device, the MAC address of the gateway device by sending an ARP packet to the gateway device based on the IP address the gateway device;
establishing, by the access device, the second gateway information entry based on the IP address, the mask and the MAC address of the gateway device; and
using, by the access device, the second gateway information entry as the first transverse isolation policy.

13. The method according to claim 12, wherein determining, by the access device, whether to perform the first transverse isolation operation for the ARP packet, comprising:
determining, by the access device, whether a source IP address in the ARP packet is all 0;
when the source IP address is not all 0, determining, by the access device, whether the source IP address in the ARP packet belongs to the subnet;
when the source IP address in the ARP packet belongs to the subnet, determining, by the access device, whether a source IP address and a destination IP address in the ARP packet are in a same subnet;
when the source IP address and the destination IP address in the ARP packet are in the same subnet, determining, by the access device, whether the source IP address in the ARP packet is the IP address of the gateway device;
when the source IP address in the ARP packet is not the IP address of the gateway device, determining, by the access device, a packet type of the ARP packet;
when the ARP packet is an ARP request packet, discarding, by the access device, the ARP packet from a terminal device, and sending, by the access device, an ARP reply packet to the terminal device, wherein the APR reply packet comprises the MAC address of the gateway device;
when the ARP packet is a free ARP packet, modifying, by the access device, a destination MAC address in the free ARP packet to the MAC address of the gateway device, and sending, by the access device, the free ARP packet to the gateway device.

14. The method according to claim 13, further comprising:
when receiving the ARP reply packet, learning, by the terminal device, the MAC address of the gateway device based on the ARP reply packet, and
sending, by the terminal device, an IP packet to the gateway device through the access device, wherein a destination MAC address in the IP packet is the MAC address of the gateway device.

15. The method according to claim 14, wherein determining, by the gateway device, whether to perform the second transverse isolation operation for the packet, comprising:
when receiving the IP packet, determining, by the gateway device, whether a destination IP address in the IP packet is the same as an IP address of one of the partial terminal devices in the allowance sub-policy;
when the destination IP address in the IP packet is different from an IP address of any of the partial terminal devices, discarding, by the gateway device, the IP packet;
when the destination IP address in the IP packet the same as the IP address of the one of the partial terminal devices, sending, by the gateway device, the IP packet to the one of the partial terminal devices corresponding to the destination IP address.

16. The method according to claim 13, wherein after the access device sends the free ARP packet to the gateway device, determining, by the gateway device, whether to perform the second transverse isolation operation for the free ARP packet, comprising:
when receiving the free ARP packet, updating and recording, by the gateway device, an MAC address of a terminal device corresponding to the free ARP packet.

17. An apparatus for isolating transverse communication between terminal devices in an intranet, comprising:
an access device in the intranet, configured to determine whether to perform a first transverse isolation operation for an ARP (Address Resolution Protocol) packet based on a pre-stored first transverse isolation policy when receiving the ARP packet; and
a gateway device in the intranet, configured to determine whether to perform a second transverse isolation operation for a packet based on a second pre-stored transverse isolation policy when receiving the packet;
wherein the first transverse isolation operation comprises at least one of:
discarding, by the access device, an ARP request packet from a terminal device, and sending an ARP reply packet for the ARP request packet to the terminal device; wherein the APR reply packet comprises an MAC (Media Access Control) address of the gateway device; or
modifying, by the access device, a destination MAC address in a free ARP packet from the terminal device to the MAC address of the gateway device, and sending the free ARP packet to the gateway device;
wherein the first transverse isolation policy and the second transverse isolation policy both comprise information of a subnet requiring isolation of transverse communication, and the transverse communication is used to indicate communication between terminal devices in a same subnet;
wherein a priority of an allowance sub-policy newly added in the second transverse isolation policy is higher than that of a basic sub-policy in the second transverse isolation policy; and
wherein the allowance sub-policy is configured to allow communication between partial terminal devices in the subnet, and the basic sub-policy is configured to isolate communication between all terminal devices in the subnet.

* * * * *